US008438475B2

(12) United States Patent
Lynton et al.

(10) Patent No.: US 8,438,475 B2
(45) Date of Patent: May 7, 2013

(54) SYSTEMS AND METHODS FOR PRODUCING USER-CONFIGURABLE ACCENTED PRESENTATIONS

(75) Inventors: Jeanette Lynton, Pleasant Grove, UT (US); Brian Holman, Provo, UT (US); Kristy McDonnell, Pleasant Grove, UT (US); Kristine Widtfeldt, Springville, UT (US)

(73) Assignee: Cabin Creek, LLC, Pleasant Grove, UT (US)

( * ) Notice: Subject to any disclaimer, the term of this patent is extended or adjusted under 35 U.S.C. 154(b) by 0 days.

(21) Appl. No.: 12/846,776

(22) Filed: Jul. 29, 2010

(65) Prior Publication Data
US 2010/0299609 A1  Nov. 25, 2010

Related U.S. Application Data

(63) Continuation-in-part of application No. 12/471,330, filed on May 22, 2009.

(60) Provisional application No. 61/229,717, filed on Jul. 30, 2009.

(51) Int. Cl.
*G06F 3/00* (2006.01)

(52) U.S. Cl.
USPC ........... 715/243; 715/246; 715/253; 715/272; 345/649; 345/658

(58) Field of Classification Search ........................ None
See application file for complete search history.

(56) References Cited

U.S. PATENT DOCUMENTS

| 3,735,516 A | 5/1973 | Wenstrom |
| 5,233,513 A | 8/1993 | Doyle |
| 5,900,002 A | 5/1999 | Bottomly |
| 6,097,389 A | 8/2000 | Morris et al. |
| 6,144,974 A | 11/2000 | Gartland |
| 6,222,947 B1 | 4/2001 | Koba |
| 6,230,173 B1 | 5/2001 | Ferret et al. |

(Continued)

FOREIGN PATENT DOCUMENTS

KR  10-2008-0108927  12/2008

OTHER PUBLICATIONS

Microsoft Publisher 2003; 2003; Microsoft Corporation.

(Continued)

*Primary Examiner* — Stephen Hong
*Assistant Examiner* — Keith Bloomquist
(74) *Attorney, Agent, or Firm* — Kirton McConkie; David B. Tingey

(57) ABSTRACT

Disclosed herein are systems and methods for the production of accented presentations using pre-defined templates and material, which presentations may be in a printed or scrapbooked format. A server system may be made available to clients over a network, that server providing templates, patterns and associated material, the server providing a client with executable instructions enabling a user to make selections to a final accented presentation. The server system may receive an order including an identification of a template and user selections, and may include an interpretive and production system that fabricates a final accented presentation, or a part of fabrication and/or assembly thereof. Detailed information on various example embodiments of the inventions are provided in the Detailed Description below, and the inventions are defined by the appended claims.

26 Claims, 8 Drawing Sheets

U.S. PATENT DOCUMENTS

| | | | |
|---|---|---|---|
| 6,358,341 | B1 | 3/2002 | Bergquist |
| 6,418,635 | B1 | 7/2002 | Nelson et al. |
| 6,596,032 | B2 | 7/2003 | Nojima et al. |
| 6,660,119 | B2 | 12/2003 | Allen et al. |
| 6,690,843 | B1 | 2/2004 | Squilla et al. |
| 7,082,436 | B1 | 7/2006 | Bayiates |
| 7,177,045 | B2 | 2/2007 | Goel et al. |
| 7,327,905 | B2 | 2/2008 | Tsue et al. |
| 7,412,659 | B2 | 8/2008 | Wessling et al. |
| 7,469,380 | B2 | 12/2008 | Wessling et al. |
| 7,474,801 | B2 | 1/2009 | Teo et al. |
| 7,594,174 | B2 | 9/2009 | Truelove et al. |
| 7,617,449 | B2 | 11/2009 | Carlson et al. |
| 7,689,909 | B1 | 3/2010 | Szuszczewicz |
| 7,900,139 | B2 | 3/2011 | Hosotsubo |
| 8,024,658 | B1 * | 9/2011 | Fagans et al. ................ 715/730 |
| 8,042,040 | B2 | 10/2011 | Lynton et al. |
| 2002/0180203 | A1 * | 12/2002 | McIntyre et al. ............... 281/22 |
| 2003/0020956 | A1 | 1/2003 | Goel et al. |
| 2003/0160824 | A1 | 8/2003 | Szumla |
| 2003/0167447 | A1 | 9/2003 | Hatta et al. |
| 2004/0088420 | A1 | 5/2004 | Allen et al. |
| 2004/0145603 | A1 * | 7/2004 | Soares ......................... 345/730 |
| 2004/0194034 | A1 | 9/2004 | Vlamis |
| 2004/0201613 | A1 | 10/2004 | Simpson et al. |
| 2004/0250205 | A1 | 12/2004 | Conning |
| 2005/0253371 | A1 | 11/2005 | Connolly |
| 2006/0026528 | A1 * | 2/2006 | Paulsen et al. ................ 715/776 |
| 2006/0038835 | A1 | 2/2006 | Cao |
| 2006/0059427 | A1 | 3/2006 | Reid et al. |
| 2006/0109516 | A1 | 5/2006 | Catalan et al. |
| 2006/0206836 | A1 | 9/2006 | Wessling et al. |
| 2007/0033542 | A1 | 2/2007 | Winser et al. |
| 2007/0043830 | A1 | 2/2007 | Housenbold et al. |
| 2007/0253029 | A1 | 11/2007 | Yamaguchi |
| 2008/0120535 | A1 | 5/2008 | Lynton |
| 2008/0215964 | A1 | 9/2008 | Abrams et al. |
| 2008/0228866 | A1 | 9/2008 | Minatogawa et al. |
| 2009/0287990 | A1 | 11/2009 | Lynton et al. |

OTHER PUBLICATIONS

Cox, Joyce, Lambert, Joan; Microsoft Office Publisher 2007 Step by Step; Aug. 15, 2007; published by Microsoft Press; Chapter 2, pp. 1-5, Chapter 3, pp. 1-6.

Lynton, Jeanette R., "Cherish" (ISBN 978-1-4236-0154-8), 2005, Gibbs Smith, Layton, UT, pp. 1-128.

www.shutterfly.com, Aug. 2005, pp. 1-7.

Lynton, Jeanette R., "Imagine" (ISBN 978-1-4236-0436-5), 2007, Gibbs Smith, Layton, UT, pp. 1-128.

Lynton, Jeanette R., "Originals" (ISBN 978-1-4236-0436-5), 2008, Gibbs Smith, Layton, UT, pp. 1-128.

Lynton, Jeanette R., "Reflections: Artwork Patterns to Make Your Scrapbook Layouts Come to Life" (ISBN 978-1-4236-0311-5), 2007, Gibbs Smith, Layton, UT, pp. 1-127.

Lynton, Jeanette R., "Wishes" (ISBN 978-4236-0437-2), 2009, Gibbs Smith, Layton, UT, pp. 1-128.

* cited by examiner

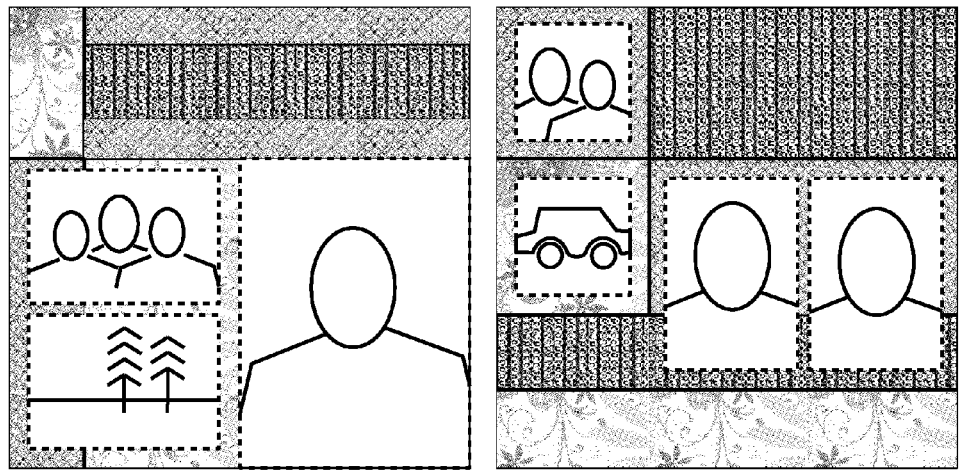
FIG. 7
FIG. 8
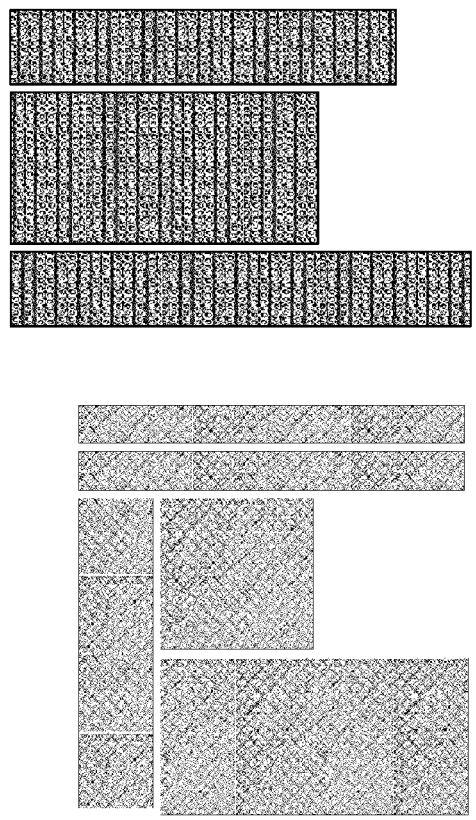

SYSTEMS AND METHODS FOR PRODUCING USER-CONFIGURABLE ACCENTED PRESENTATIONS

CROSS-REFERENCES TO RELATED APPLICATIONS

This application claims the benefit of U.S. Provisional Application No. 61/229,717 filed Jul. 30, 2009, which is incorporated by reference in its entirety. This application is a continuation-in-part of U.S. application Ser. No. 12/471,330 filed May 22, 2009 entitled "Systems and Methods for Dynamically Generating Graphical Memorabilia Projects for Presentation and Use", which is also incorporated by reference in its entirety.

BACKGROUND

Organized physical presentations of information have been known for many years. It is often desirable to preserve and transfer a physical representation of information from one person to another while maintaining a context with such a transfer.

One of the oldest kinds of presentations is a book. The creation of books was originally a manual operation, requiring much labor. Printing technologies were developed, resulting in an author's ability to distribute a presentation more widely. However, printed presentations have always suffered from the limitations of the printing process, and although printing technologies have advanced from printing presses to modern multi-color desktop printers, these technologies have generally been limited to the production of words and images on simple sheets of paper.

There are those for whom the uniformity of printing processes is undesirable in a presentation. One of the main reasons for this is that printed presentations lack a certain personal touch. One can add a handwritten note to a printed presentation, but some desire a mode of greater personal expression. This is often desired in a personal memento or record, such as in a family photo album or in a corporate history. To achieve this, persons have collected various elements expressing feelings or recording aspects of the events depicted. For example, it is known to press a leaf in the pages of a photo album at the location in which photographs are attached of a trip to view autumn leaves. It is also known for a person to save invitations and bits of decoration from an event, such as a corporate party or a wedding, and embed these into a presentation of these events.

Some have taken this a step further, and have sought to accent a presentation with a personal touch through the use of papers, stickers, labels, ribbons and other material attachable to a presentation. For example, one can obtain images related to live events, such as the birth of a child, which images might for example be "ABC" blocks, teddy bears and cradles. In other cases, it is desirable to frame or decorate photographs within a presentation, for which a person may create or use pre-printed accents. There is a wide selection of materials available for such "scrapbooking" activities.

Even though those materials are available, the creator of an accented presentation is still burdened with the same laborious and manual task of assembling accented pages as from centuries ago. This task involves obtaining and fashioning these accents, which may include shopping for appropriate materials and cutting, folding and otherwise fashioning them into the desired accents. For those preparing only a page or two of personal presentation, this is not significant. However, until recently there has not been a way for a creator to efficiently create accents for a presentation having a large number of pages.

The claimed systems and methods relate generally to systems that can produce visual presentations by selections and content made by an end-user, and more particularly to systems that interact with a client device over a network, providing the client device templates and content related to choices made available, and further providing instructions executable by the client device capable of interpreting provided templates and rendering visual representations of a final user-accented presentation in accordance with selections made.

BRIEF SUMMARY

Disclosed herein are systems and methods for the production of accented presentations using pre-defined templates and material, which presentations may be in a printed or scrap-booked format. A server system may be made available to clients over a network, that server providing templates, patterns and associated material, the server providing a client with executable instructions enabling a user to make selections to a final accented presentation. The server system may receive an order including an identification of a template and user selections, and may include an interpretive and production system that fabricates a final accented presentation, or a part of fabrication and/or assembly thereof. Detailed information on various example embodiments of the inventions are provided in the Detailed Description below, and the inventions are defined by the appended claims.

BRIEF DESCRIPTION OF THE DRAWINGS

FIG. 7 shows the insertion of user-content images into the theme-applied accent template of FIG. 6.

FIG. 8 shows theme-applied accent elements as cut from common material.

Reference will now be made in detail to particular implementations of the various inventions described herein in their various aspects, examples of which are illustrated in the accompanying drawings and in the detailed description below.

DETAILED DESCRIPTION

Figure 1:
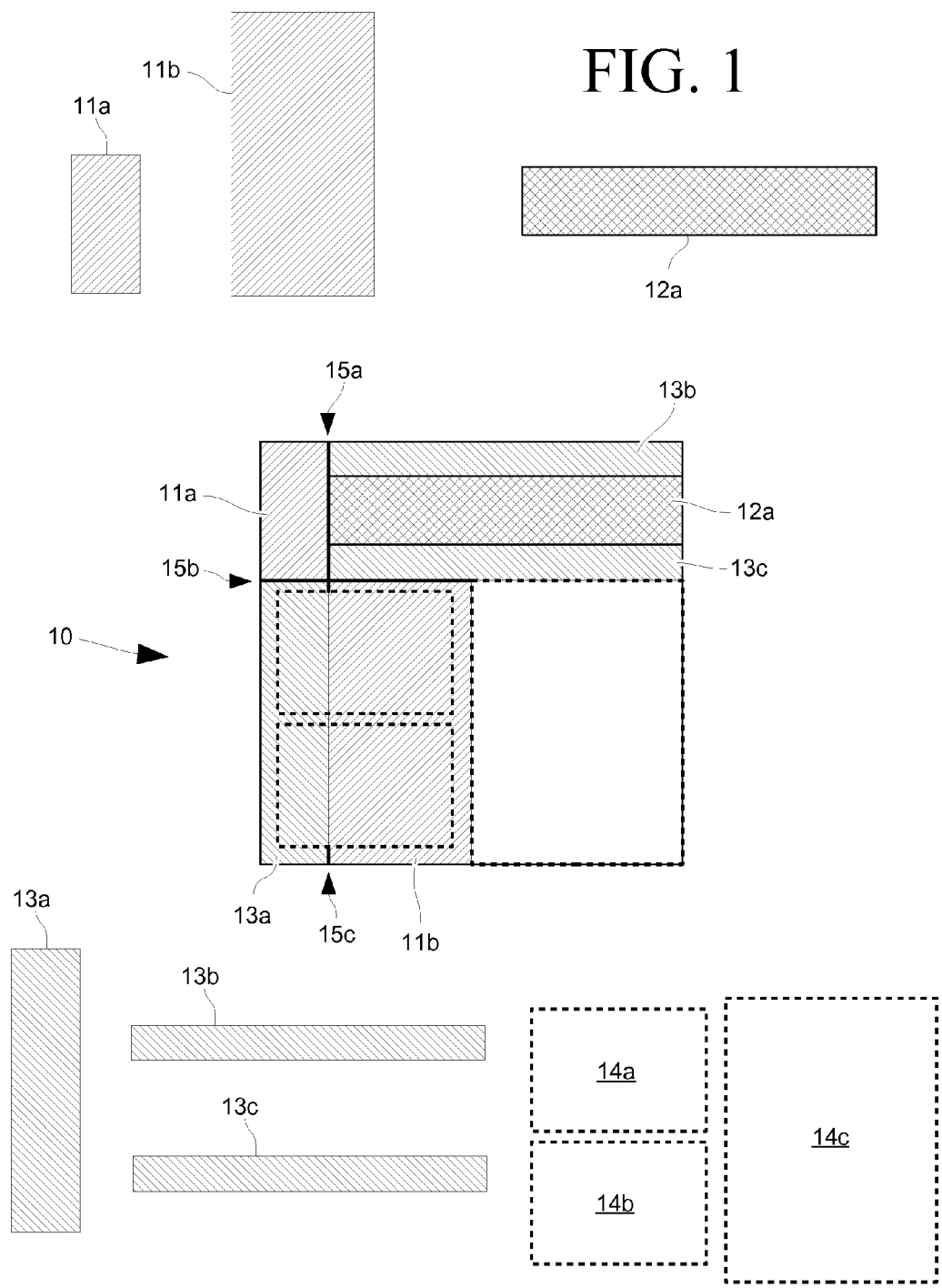
FIG. 1 illustrates the elements of an accent template.

FIG. 1 shows the construction of one type of accent template, which can be used in the creation of accents for a page of a presentation. Hereinafter an accent template, or merely template, is an object that contains specifications for the position of visual elements within a rendered image and/or an accented product, as will become clear through the explanations below. Exemplary template 10 is shown in in form with its accent elements in position, and the individual accent elements surrounding in conceptual form. In this example, accent elements are divided into three groups or "slots", meaning that elements within these groups are to share a common material, pattern, texture or other quality. A first group is formed by accent elements 11a and 11b, a second group by element 12a, and a third group by elements 13a, 13b and 13c. As shown, each accent element in this example has a defined shape and size, which here is rectangular in several widths and heights. It is to be understood that the rectangular shape shown here is merely illustrative, and that accent elements of other shapes, sizes, formats and forms can be equally used.

As shown in FIG. 1, the accent elements have an existence that is logically independent from the template. That is because at the time the accents corresponding to the accent elements are fabricated, they may be independent objects from the presentation page into which they are to be incorporated. If desired, these accent elements may have an orientation attribute that specifies a direction for the fabricated accent. For example, it may be that the material from which an accent is to be fabricated contains a pattern, such as a printed pattern or a fabric nap, that should run in a certain direction on the final page. It might also be that the fabricated accents are to carry a common orientation with respect to each other, but orientation with respect to the page is not important. It may also be that accents might be oriented differently for effect, or that a random orientation is acceptable or desired.

Even though there is a certain independence of the accent elements from the template, the template itself contains the definition of the accent elements that define the contents of the presentation page. These accent elements are herein referred to as accent pairs, although an accent element may contain more than two informational items, as explained below. An accent pair contains at least two items of information for the accent to which it refers, which are the position of the accent in the template and the slot to which the accent is assigned. An accent pair may also contain other informational items, including but not limited to a height, width, orientation, shape, bias, finish, order of assembly, overlapping configuration and any other item describing a produced accent or its relation to other accents within the template.

One informational item that may also be advantageously used is a description of the location, orientation and type of a cut from material from which an accent is to be fabricated. For example, it may be that an accent will be fabricated from a printed material with a repeating pattern, that pattern having a larger and visually distinguishable element such as a large pictoral object such as a face or a flower. Ordinarily, such an object should not appear in a severed view or upside-down. However, in some cases the accent will be of such a form that a cut will not be important, in which case it can be identified as an accent element that does not require positional information.

Also within the exemplary template of FIG. 1 are image wells 14a, 14b and 14c, shown in dashed lines, which are the locations for images to be placed in the template. These image wells are not required in a template, but they may be included to provide perspective to the user showing how the accent elements interplay with images that may be included in the final presentation page.

Templates may also include other elements, such as lines 15a, 15b and 15c, or other objects as desired. A template may also be associated with or include instructions for assembly, perhaps including a list of operations of assembly and a visual representation of the template elements on a page.

Figure 2:
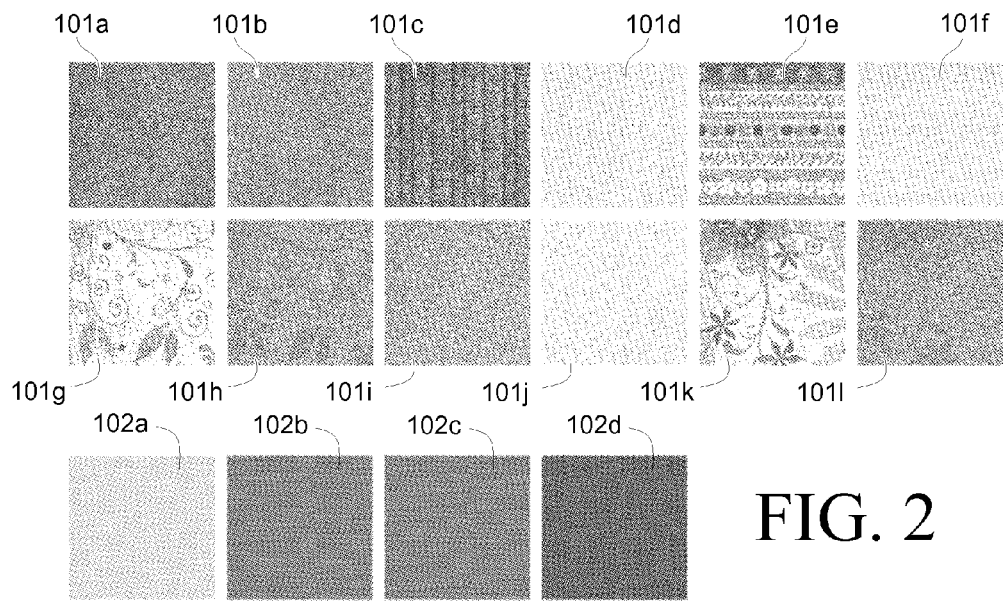
FIG. 2 depicts an exemplary set of patterns and colors available for use in accent templates.

Accent templates, as described above, are useful for coordinating the accents that will become a part of a presented page. A number of materials may be available for incorporation into those pages by way of available accent templates, through the slots specified therein. Turning now to FIG. 2, a number of designs might be available for use in a presentation page. For simplicity, this example references only visual patterns, but it is to be understood that the materials made available may include variations in texture, composition, gloss and other properties as desired. Here, the available materials include a set of twelve printed patterns, 101a through 101l, and four solid colors, 102a through 102d. Again, this set is merely one of an infinite variety that can be used, presented here for the simplicity of explanation.

Figure 3A:
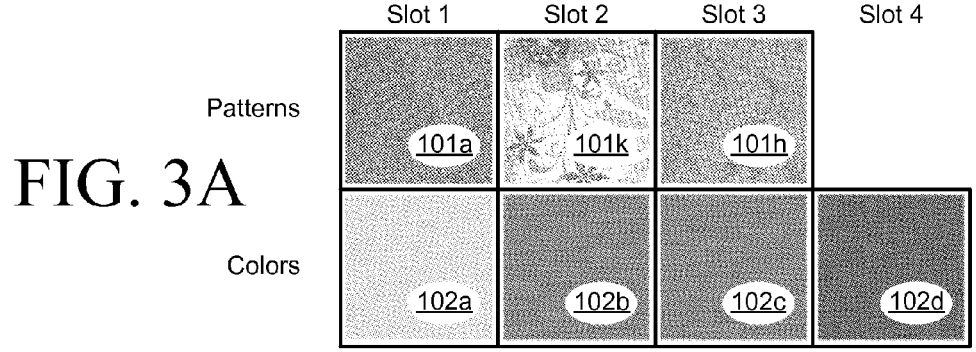
FIG. 3 conceptually illustrates the construction of two exemplary themes.
Figure 3B:
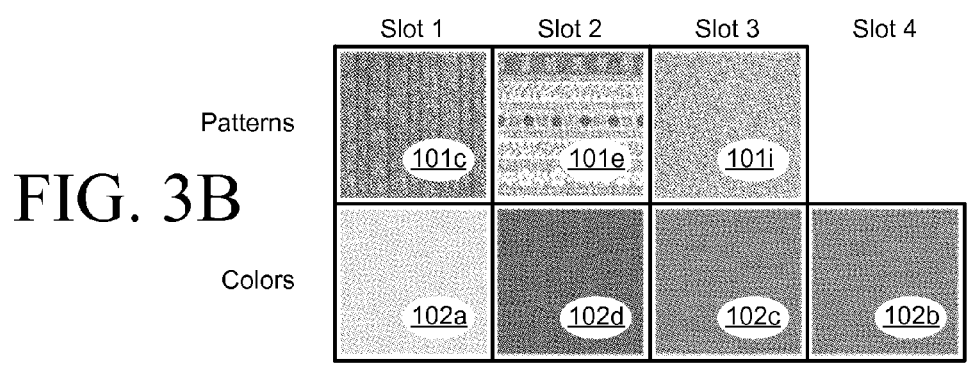

To facilitate the selection of patterns, a number of themes may be created. A theme is simply a collection of slot to design assignments, two of which are shown in FIGS. 3A and 3B. In those themes, the slots are enumerated between a set of pattern designs and a set of color designs, but no particular organization is required. The theme of FIG. 3A takes on a botanical flavor, with the selection of floral and earthy patterns 101a, 101k and 101h in slots 1, 2 and 3 respectively. The theme of FIG. 3B is more geometric, with the selection of geometric patterns 101c, 101e and 101i in slots 1, 2 and 3 respectively. Note that both of these themes use the same colors, but these colors are arranged differently in slots 1-4.

Figure 4:
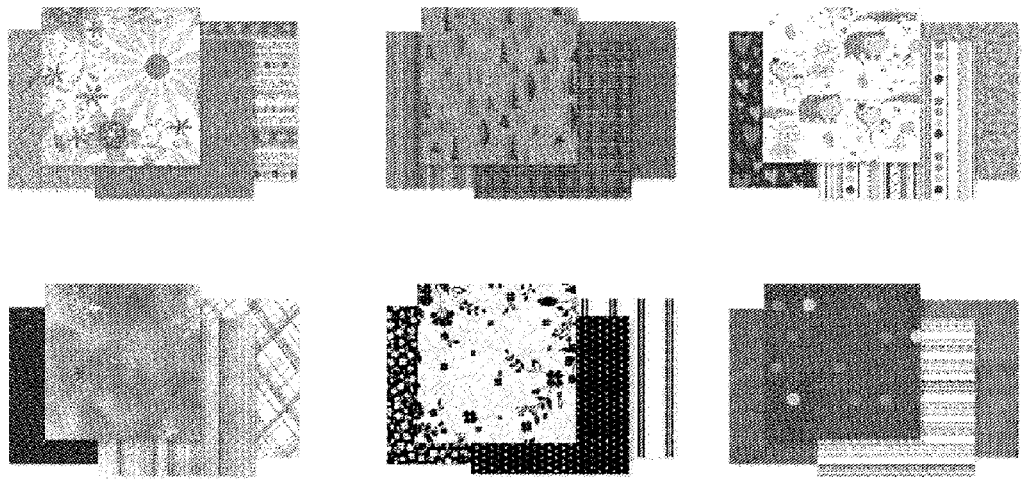
FIG. 4 illustrates several sets of patterns forming several exemplary themes.
Figure 5:
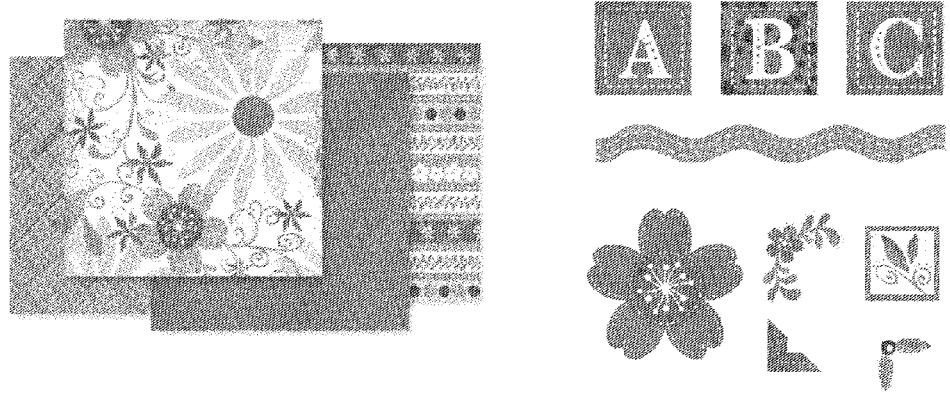
FIG. 5 shows a theme having patterns and other objects and content.

As shown in FIG. 4, a wide variety of themes may be created, using whatever materials that may be in availability. The provision of such themes presents a person with an easier task in the selection of such materials, as themes may be created specifying materials that are coordinated in color, pattern, style, subject matter or other attributes. As suggested above, accents may be used that are not rectangular in shape, and are not necessarily cut from a sheet of continuous patterned paper. As shown in the theme of FIG. 5, such accents may include labels bearing singular or plural objects, ribbons, photograph corner mounts or accents, or other objects that are made a part of a particular theme. Such objects may be made a part of a template, such that a template may specify the kind of such non-patterned or non-cut objects included with other accent elements. However, for the purposes of simplicity, the majority of this disclosure simply references patterns and colors.

Figure 6:
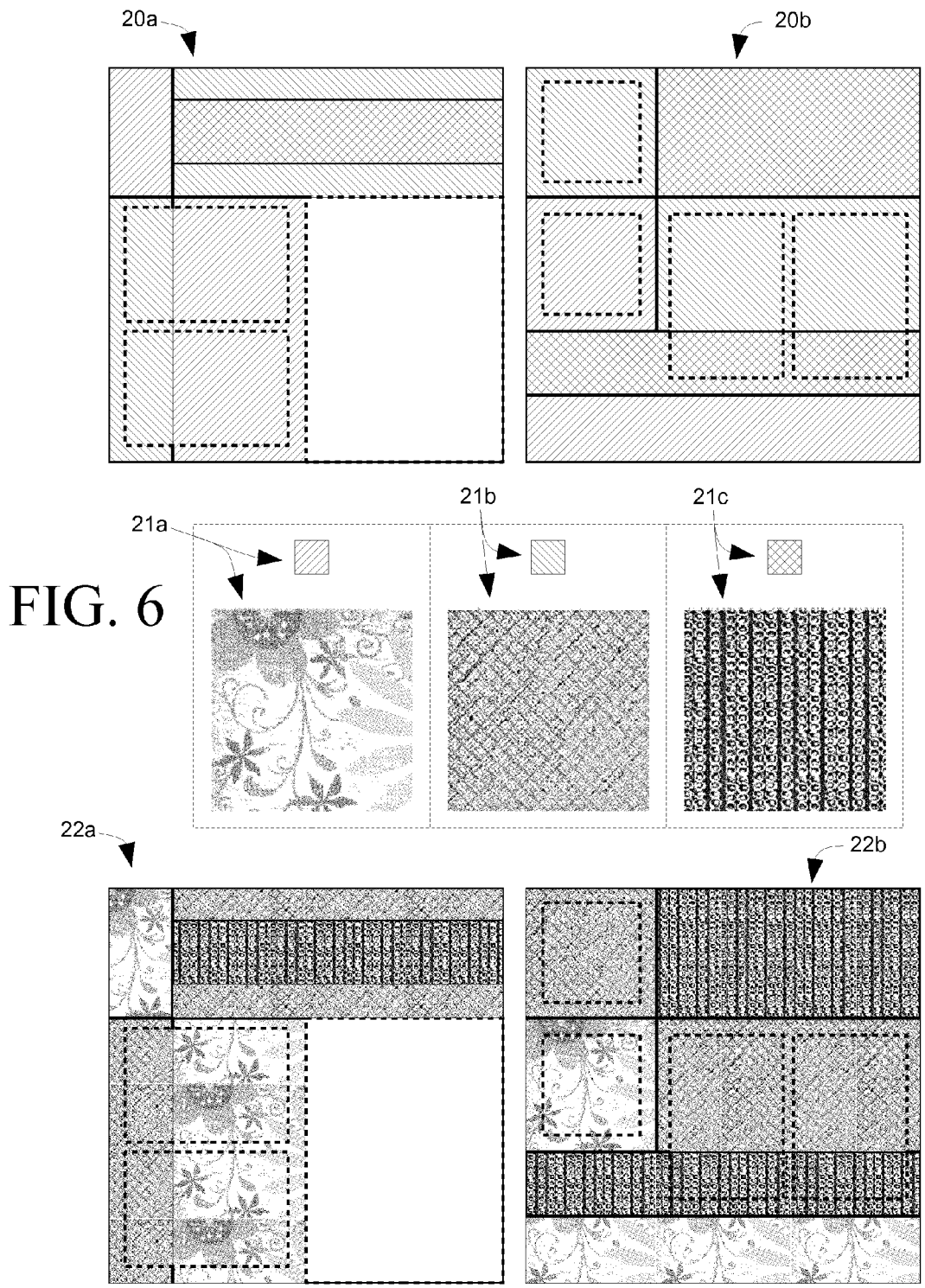
FIG. 6 illustrates the application of a theme to an exemplary type of accent template.

The application of a theme to an accent template may be made as shown in FIG. 6. In this example, the accent template is divided between two pages, 20a and 20b. Accent templates that specify more than one page may be used where a presentation is viewed more than one page at a time, for example, in a book containing content on both sides of a page. Where such presentation pages are viewed together, an accent template may be applied with a common theme and with accents and other content appearing on both pages being coordinated therebetween. Although in this example a template is configured for two pages, an accent template may also be configured for more pages as desired. This may be done, for example, to provide for coordination among a number of pages, permitting a person to select a theme across several pages of a presentation without the burden of selecting a template and a theme for smaller groups of pages.

Returning to FIG. 6, the accent elements of both pages 20a and 20b of the template are divided between three slots, represented by shading in diagonal lines to the right, diagonal lines to the left, and cross-hatched lines. A theme associates these slots to a design, which associations are 21a for the first slot, 21b for the second, and 21c for the third. After application of a theme to a template, a themed representation is produced, which in this example is divided between pages 22a and 22b. A themed representation may be displayed for a person, allowing for the evaluation of various template and theme combinations and a selection thereof.

The themed representation of FIG. 6 may be displayed with image wells indicated, such as with dashed lines as in the figure. This may assist the viewer in perceiving the finished product. If desired, a themed representation may also include images that are to become a part of the finished product. Images are provided for the image wells, and before or after application of a theme to the template, the images are inserted into the representation such as shown in FIG. 7. Generally, an image will be referenced for each image well, and for some configurations the uploading of images over a network will be appropriate.

Eventually, a person making a presentation will make a final selection of a template and a theme. At that time that person will desire to obtain the finished accented product. A system that applies templates and themes may output a product in several forms. Ideally, this product would be the final presentation itself, and machines may be constructed that would do exactly that. For example, the fabrication of a final presentation might be the generation of an electronic file or record, perhaps containing an image of the presentation, stored to a tangible medium such as a hard disk or a portable medium such as a CD-ROM. Alternatively, the fabrication of a final presentation might be to a traditional physical scrapbooking page, or the creation of elements of such a page such as physical accents or images thereof. It is recognized that at the present time most persons are restricted to machines that print single sheets of paper, and do not apply accents to a presentation autonomously. For most persons desiring a traditional physical scrapbooking form, the components of a presentation will be created in a form to be assembled. Persons incorporating images into presentations may have photographs, images and other personal content available to them beforehand, which do not need to be provided. For them, accents may be provided in a raw form, that is in raw materials such as printed paper ready to be cut, with instructions and/or templates to facilitate assembly. However, an entity may perform an additional service by providing accents that are ready to adhere to a presentation without a cutting or fashioning operation by the assembler.

For traditional scrapbooking, accents may be provided to the assembler in a kit, optionally including instructions for assembly. Thus, in the ordinary circumstance a person will adhere produced accents in combination with personally-supplied material to a base page, such as a blank page in a bound book. If the accents are provided to the assembler in a ready-to-use form, they will be pre-cut to the size and form specified by an accent template. Now referring to FIG. 8, the accents specified by the template and theme combination of FIG. 6 are shown, which exist as accents in three designs. The reader will recall that the finished designs are determined through the application of the themed designs to the slots of the templates, and here where three slots were present in the accent template, three groups of patterned accents are produced. Each group is formed from a base piece of material having the selected design, from which the accents of the group are cut. Although these cuts may be made manually, they can be automated through the use of pre-made dies, or through the use of a programmable cutting machine. By doing so the end-user is relieved from having to acquire the stock bearing the design of a selected theme, and from having to cut the accents himself.

If accents are machine-cut, the cutting operation may include accents across pages, across several template/theme combinations, or even across orders for different customers. By doing so, material may potentially be conserved. In the example of FIG. 8, accents are cut in the arrangement shown, which accents are across both pages of the originating template. Following cutting, the accent pieces can be separated and grouped by page for the ease of presentation assembly.

Through the procedure described above, the number of presentation pages that can be specified can be quite large, which is determined by the number of accent templates available multiplied by the number of available themes. The number of possible presentation pages can be increased by permitting modifications to be made to the accent templates.

One modification that may be made is by rotation. A person selecting an accent template may be presented with the option of selecting the original orientation, or rotating the template by some amount. Where a template is of the same width and height, this is a relatively simple operation if rotations of 90, 180 and 270 degrees are made available. By allowing this, the number of logical templates is increased by a factor of four.

Figure 9:
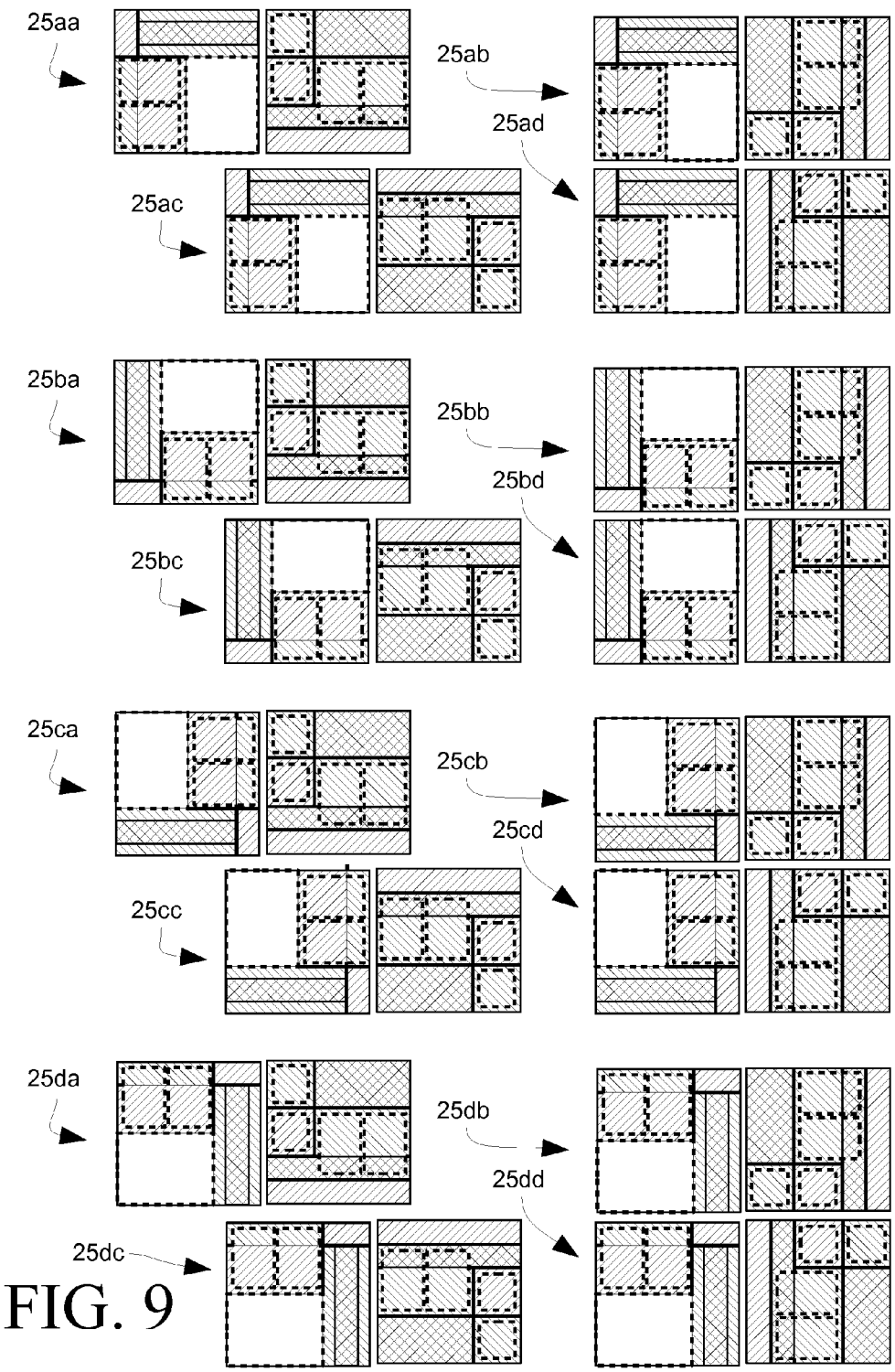
FIG. 9 illustrates the combinations available by rotation applied to an exemplary template.

For templates that contain accent elements for more than one page, rotation may be specified for each page. For example, the template of FIG. 6 contains two pages, each of which may be rotated. As shown in FIG. 9, orthogonal rotation of the left page yields the original non-rotated arrangement 25aa and three additional combinations 25aa, 25ba, 25ca and 25da. Rotation of the right page produces twelve additional arrangements for a total of sixteen. Where a template contains multiple pages, each may be rotated to increase the available arrangements.

In the examples shown, accent templates are fashioned for display pages that are square. This makes rotation a relatively easy matter. Non-square pages may also be used. Also in the examples shown, orthogonal rotations are shown, that is rotations of 90, 180, and 270 degrees that are orthogonal to the geometry of the accent elements within a template. Other rotations may also be used.

It may be desired to maintain the orientation of accents, patterns and other content even through rotation of a template or page. To that end, the accent pairs of a template may specify whether the accent corresponding to the accent pair is to rotate with the rotation of its template or to remain rotationally stable. Such an attribute may also be applied to the content to be applied to a template, thus a accents or user images may specify an orientation, or that they are not to be rotated with a template or page.

It is to be understood that if rotation is permitted, a template should be designed with that goal in mind. Thus, any accent elements that are directional in nature, such as text fields or elements that produce an image of an object, could be adversely effected. Such elements may be made substantially square, if desired, to avoid this problem. Alternatively, rotations of other than 180 degrees might be disallowed. Alternatively, rotation of certain templates may be entirely disallowed. Also, if a template includes more than one page, a user may select to swap or reorder pages, thus providing more combinations in the output of an accented presentation.

Exemplary Systems

In the description above, it is contemplated that the functions of a production system utilizing templates and accents might be incorporated into a single computer or other processing system, or might be distributed among a number of processing systems located at dispersed locations. For example, an optical computer-readable disc might contain a library of templates, themes, patterns and other objects, and software for accessing and utilizing these to determine a presentation page. In another example, a collection of templates might be located at one network location, with patterns located elsewhere, and with software located at a third location configured to access templates, themes, patterns and other objects at their assigned network locations.

One consumer model uses a client-server approach, which allows for certain conveniences to an end-user. Now referring to FIG. 10, a preferred client-server model utilizes a client 200 which accesses a server 202 over a network, the client 200 and server 202 communicating through the transmission of informational records as is known in network communication. In this model, client 200 is maintained independently of server 202, and server 202 acts as a long-term repository of templates, patterns and other objects. Thus, client 200 need not maintain a repository of these objects beyond a session with server 202.

Client 200, however, does maintain software to provide network communication to server 202, and also provides at least basic functionality for user interaction with server 202. In one example, client 200 is an ordinary consumer computer capable of operating a web browser that can display HTML formatted content and also run executable code provided remotely, using a JAVA™ or a Flash™ interpreter. In the preferred model, it is desired to require only generic functionality of a client 200, locating application-specific functionality to a server 202 on a long-term basis across interactive sessions with various clients, thus permitting a wide base of end-users who may use this model without substantial installation steps at client 200.

Server 202 is a system generally providing content to and receiving selections from clients 200. Server 202 maintains content to be provided, which are here in a template repository 204, a user content repository 206, a pattern repository 208, and a repository for other content 210, which are further described below. Server 202 could be a single computer device, although in alternative models server 202 is a collection of devices and network nodes operating as a single access point for a client 200.

In the preferred model, and recognizing certain expected events shown to the left in circles in FIG. 10, interaction between client 200 and server 202 is generally as follows. A client 200 first makes a request for a network connection to server 202, which might be made over the Internet, in one example. With such a request for a connection 220 between the two, a connection is established and server 202 returns a number of informational items. This may include a screen confirming that a connection has been made, an introduction to the service provided at server 202, identification of the provider, etc. In the course of presenting such informational items, a selection object is returned 222. The selection object is a device provided to client 200 to select between a number of templates provided by the server 202, which object may also provide for the selection of other options, such the selection of a theme or particular methods of interaction between server 202 and client 200. An end-user at client 200 may then make a selection of a template 250 by interaction with client 200, which selection is transmitted 224 to server 202.

Following the selection of a template, it is delivered to the client 200 from the template repository 204. Template repository 204 may include a number of templates for the creation of accented presentation, which templates may be fashioned in many forms. Of these forms, a preferred one for two-dimensional pages utilizes a modified form of the Scalable Vector Graphics (SVG) standard published by the World Wide Web Consortium, which modifications permit the referencing of content available on server 202 for display on client 200 to an end-user. The SVG standard is not required, but rather it provides a convenient platform for the description of graphical elements that may be defined for a template and optionally for a produced accented presentation.

Although some web browsers include SVG functionality, the preferred model uses functionality not available to common SVG engines. Therefore, in the preferred model an engine is provided to client 200 by server 202 capable of displaying rendered representations of templates, of accepting selections made by an end-user, and otherwise of interacting with the functionality made available by server 202. In the preferred model this engine is Flash-based, meaning that it consists of code capable of being interpreted and executed by a web browser that includes the functionality provided by the Flash™ plugin now maintained by Adobe Systems. In alternative models, a different interpreter may be used in connection with a web browser, or a custom web browser or another application may be used to provide similar template interpretive and selection functions. In yet another alternative, a template is provided that is itself executable by client 200, the template maintaining user selections by internal program state.

Figure 10:
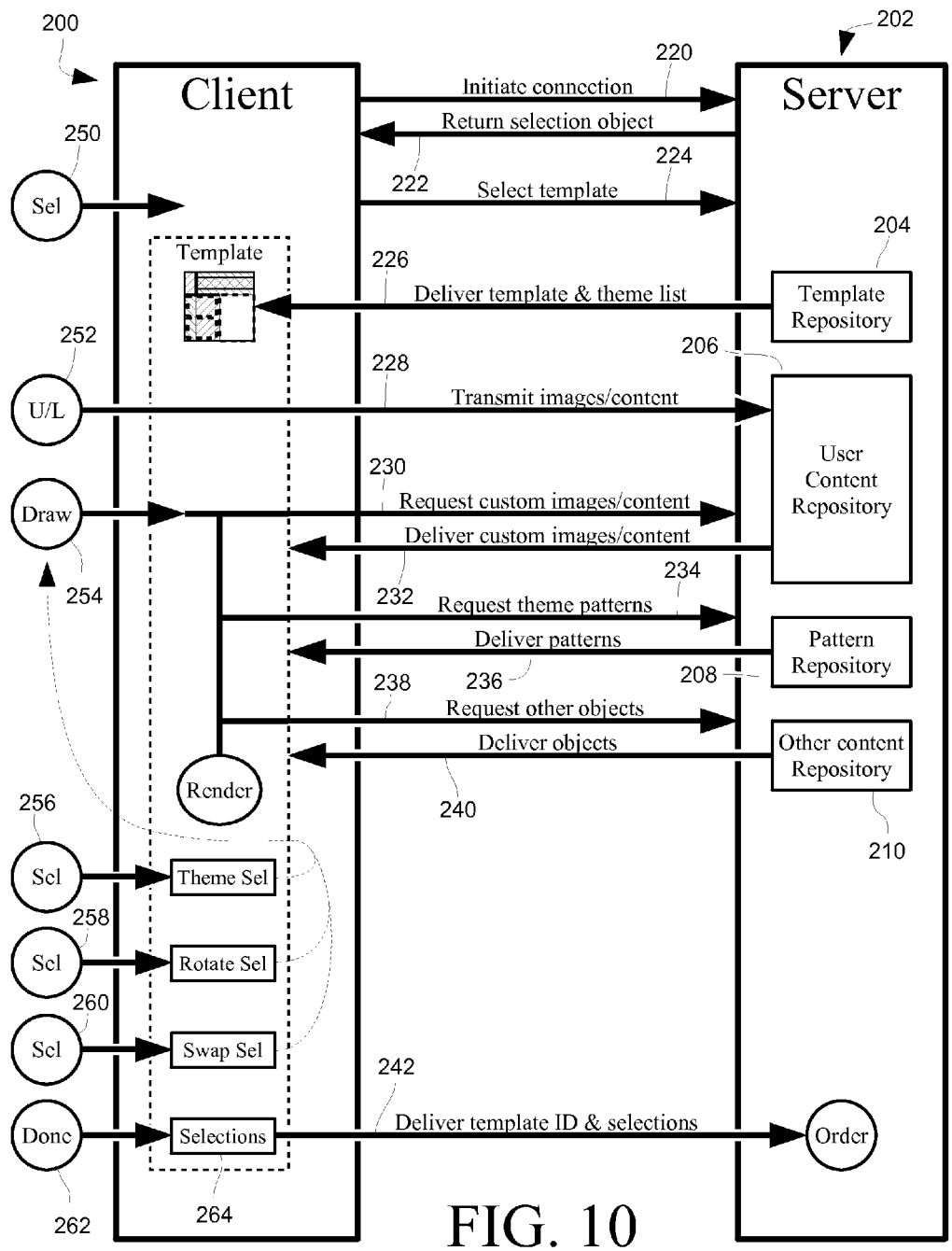
FIG. 10 conceptually illustrates a client-server system for providing to a networked user the services of a provider of accent templates.

Continuing in FIG. 10, upon the transmission of a selection of a template 224, server 202 delivers the selected template 226 and, in one example, a list of themes that may be applied to that template, by way of a selection object. Some models may include a common set of themes applicable to all available templates within repository 204, while others will provide for specific themes designed for a subset of available templates. Other models may restrict a user's choices to the content specified in a theme, while others allow the selection of individual patterns and objects that may be applied to elements included within a template. The selection of a theme, when made, is delivered to server 202, and the selection of other content to be applied is further discussed below.

It is contemplated herein that some accented presentations will be completed with only content made available by a provider, while other presentations will include content supplied by a user. For example, it may be desired to present a customer with an accented presentation ready to accept user content, for example photographs attached to such a presentation. Alternatively, a user might provide content prior to the creation of an accented presentation, incorporated therein at the time of fabrication. Therefore, server 202 may include the optional functionality of receiving and storing custom images and content. Upon a user indication of content desired to be used in a template 252, such content may be transmitted 228 to server 202, which is stored in a user content repository 206.

At various times, a representation of a current template and its current selections may be requested to be drawn 254 for the benefit of the end user at client 200. That drawing process includes requesting objects from server 202, including the request of patterns of a theme 234, custom images or other user content 230, and other objects that may be available for use with a current template 238. These are returned by server from available repositories, returning patterns 236 from repository 208, user content 232 from repository 206, and other content 240 from repository 210. Note, however, that the requesting of objects from server 202 may be avoided where those objects are available such as through a cache. Likewise, user images and other content may be maintained at client 200, which might need only be requested from server 202 if a session is interrupted. Upon having the corresponding patterns, images and other objects corresponding to the user's selections within a template, the client computer may render a visual representation of the accented presentation corresponding to the current user's selections.

As a user proceeds to use client 200 and a downloaded template, he will make changes to the selections specifying the accents to be applied. Those selections may be to a theme 256, rotation 258, swap 260, and other selections made available through the template and its accompanying instructions and functionality. As these selections are received, client 200 maintains the state of these selections, changes to which may cause a new draw event 254.

Eventually, a user can be expected to have made his selections to the template, upon which he may desire that an accented presentation be produced in accordance with a currently selected template and its accompanying selections. If so, a user may indicate to client 200 that he is done 262 by executing an action such as by clicking a graphical button or selecting a menu item, upon which the current selections 264 and an identification of the current template are sent 242 to the server 202, which submission may constitute an order for production.

Figure 11:
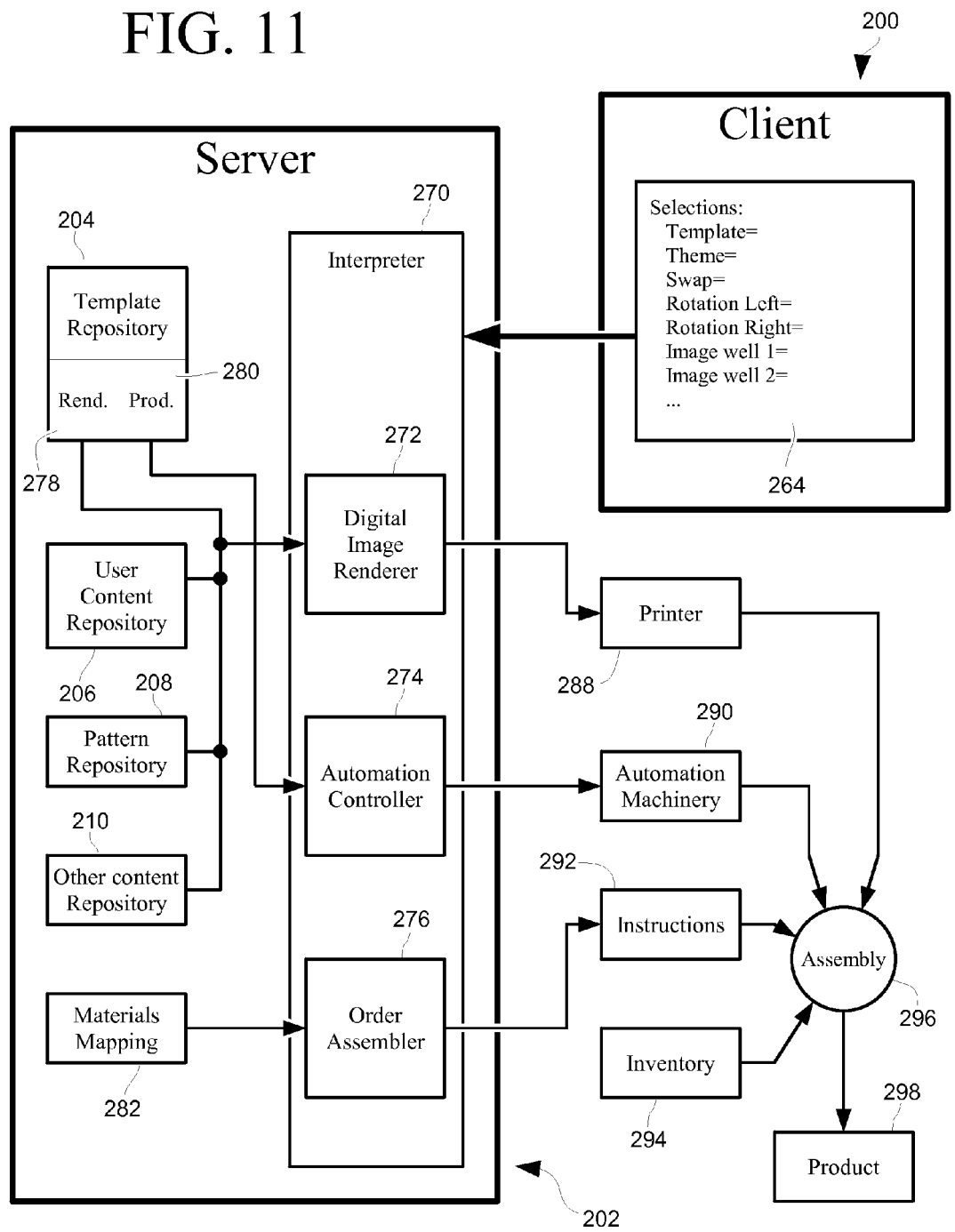
FIG. 11 conceptually illustrates a server system for production of accented presentation content as specified by a user through accent templates.

Now turning to FIG. 11, a set of selections and identification of a template 264 may be sent from a client 200 to a server 202. Specifically, these selections and identification may be received and executed by an interpreter 270, although use of a unitary interpreter as shown is not required. In the example shown, server 202 is capable of three forms of accented presentation production, which provide examples for discussion of a wide range of possible production methods.

In the first production method, the output includes the rendering of a digital image. To that end, interpreter 270 includes a digital image renderer 272 which is operable to interpret an identified template and selections within an order. To render such an image, the renderer 272 may access rendering instructions 278 corresponding to the identified template, selected patterns from the pattern repository 208, other content 210, and user images and other content from repository 206, if such user content has been uploaded and selected. The output of renderer 272 may be an image or other electronic form of the final accented presentation if desired, subsequently stored for later use, however in this example the image produced by renderer 272 is supplied to a printer 288, which printer may output a hardcopy of an image in any desired or selected quality or format.

In a second production method, an image is not necessarily output, but rather portions of an accented presentation are produced. For example, the user may have selected that portions of the final presentation be in a specially made paper, for example textured paper. It may not be known beforehand what configuration those parts will take, and therefore there may be an additional manufacturing step to take for the presentation. For that method, interpreter 270 includes an automation controller 274, which operates automation machinery 290 in the fabrication of these presentation portions. Controller 274 may access production instructions 280 associated with the template identified by the user, which instructions may consider any selections made. Note that rendering instructions 278 and production instructions 280 need not be delivered to client 200, but may be held locally to server system 202.

In a third production method, neither image production nor automation is engaged, but rather pre-fashioned materials are made available for an order. These materials may be made in a form that is ready to apply to an accented production, or they may require additional steps by the end-user. For this method, interpreter 270 includes an order assembler 276, the output of which are instructions 292 which appear on a display or other human-readable format for fashioning, providing and/or applying parts of a final accented presentation specified by the identified template in conjunction with user selections made. Order assembler 276 utilizes a mapping 282 of these parts to materials in inventory, permitting instructions 292 to be made. A worker may read instructions 292 and retrieve materials from inventory 294, applying whatever fashioning steps are needed, as may be specified by instructions 292.

Further in the example of FIG. 11, it is contemplated that several production methods may be in use at the same time for an order, and thus an assembly step 296 is utilized to form a final product 298 for the end user. The assembly step 296 may be simply collecting the output from the production methods used, but may also include steps to integrate these output products into the final product 298, which may optionally be a final accented presentation. For example, accents from inventory 294 or the output of machinery 290 might be included or applied to a hardcopy produced by printer 288.

Now it is to be recognized that the systems, methods, products and features described above in relation to accented presentations may be incorporated singly, or any number of these features may be incorporated, consistent with the principles and purposes disclosed herein. It is therefore to be recognized that the products, systems and methods described herein are merely exemplary and may be modified as taught herein and as will be understood by one of ordinary skill.

What is claimed:

1. A production system for producing an accented product in accordance with personal selections, comprising:

a server system, said server system operable to host network communications with clients, said server system comprising a computer-readable, non-transitory storage medium for providing computer program code means for providing instructions;

a client system, said client system operable to access said server system over a network, said client system further including processing facilities operable to execute said instructions provided by said server system;

wherein said server system further includes a repository of templates, each of said templates including a plurality of wells for receiving visual elements, said templates further including instructions for rendering an image as specified by current selection states, said instructions further specifying the position of the visual elements within a rendered image and the accented product, wherein the plurality of wells of a first template from the repository of templates is configured to rotate with the first template as it changes its orientation, and wherein instructions for the first template indicate that a first of the visual elements is to rotate and change its orientation in correspondence with a change in orientation of the first template, while a second of the visual elements is to maintain its original orientation as the first template changes its orientation;

wherein said client system is further operable to accept from a user selections and maintain the state thereof, that state including selections as to an aspect selected from a desired theme; a rotational factor, and a swap factor;

wherein said client system is operable to download and execute the first template from said repository of templates located at said server system, wherein in the execution by the client system, the user selections maintained at the client system are applied to the first template to produce a representation of the first template with user selections applied;

wherein said server system further includes a repository of accent elements accessible to clients over network communications, further wherein said production system specifies a theme to accent element correspondence;

wherein in the execution of said instructions for rendering the image which are included within the first template, said client system produces requests for accent elements, and said server system delivers said accent elements upon request from said repository of accent elements;

wherein said client system is further operable to deliver to said server system an order identifying the first template and a set of user selections relative to the first template; and wherein said server system is further operable to receive the order from the client system identifying the first template and the set of user selections relative to the first template, said server system being further operable to interpret the order received from the client system, said interpreting executing an automated step in the production of a product accented in conformance with the received order.

2. A production system as recited in claim 1, further wherein said client system maintains a cache of accent elements received from said server system.

3. A production system as recited in claim 1, further wherein said client system is operable to access local content as directed by the user, further wherein said client system is operable to receive a specification of user content within the context of the first template, and further wherein in the rendering of the image from the first template said rendering includes a representation of user content specified within the context of the first template.

4. A production system as recited in claim 3, further wherein said server system includes a user content repository, further wherein said client system is operable to upload user-content to said server system and said server system is configured to receive such user-content and deposit into said user content repository, further wherein said client system is operable to deliver selections of user-content having an order with other user selections, further wherein said server system is configured to receive such an order including said user-content selections and said server system is configured to execute an automated step that utilizes specified user content located within said user content repository.

5. A production system as recited in claim 1, further wherein said server system includes a user content repository, further wherein said client system is operable to access local images as directed by the user, further wherein said client system is operable to upload user images to said server system and said server system is configured to receive such user images and deposit into said user content repository, further wherein said client system is operable to receive a specification of user images within the context of the first template, further wherein in the rendering of the image from the first template said rendering includes a representation of user images specified within the context of the first template, further wherein said client system is operable to deliver selections of user images with an order including other user selections, further wherein said server system is configured to receive such an order including user image selections and said server system is configured to execute an automated step that utilizes specified user images located within said user content repository in the rendering of a production image.

6. A production system as recited in claim 5, wherein said server system is configured to produce a physical copy of a rendered production image.

7. A production system as recited in claim 1, wherein said server system is configured in said interpreting to execute the automated step of controlling a machine that produces portions of the accented product specified by the identification of the first template and user selections in conformance with the received order.

8. A production system as recited in claim 1, wherein said server system is configured in said interpreting to execute the automated step of producing a set of human-readable instructions for the assembly of the received order identifying the first template and the set of user selections.

9. A production system as recited in claim 8, wherein said server system in the execution of the automated step of producing the set of human-readable instructions, utilizes a mapping of template and theme correspondences to part identification to produce instructions that reference part identification.

10. A production system as recited in claim 1, wherein each template in said repository of templates specifies a set of accent pairs, each accent pair specifying an accent position, a page and a slot.

11. A production system for producing an accented product in accordance with personal selections, comprising:
   a repository of templates, each of said templates including a plurality of wells for receiving visual elements, said templates further including instructions for receiving and maintaining selection states and further including instructions for rendering an image as specified by current selection states, said instructions further specifying the position of the visual elements within a rendered image and an accented product, wherein the plurality of wells of a first template from the repository of templates are configured to rotate with a first template as it changes its orientation, and wherein instructions for the first template indicate that a first of the visual elements is to rotate and change its orientation in correspondence with a change in orientation of the first template, while a second of the visual elements is to maintain its original orientation as the first template changes its orientation;
   a repository of accent elements;
   a processing system operable to execute instructions and further operable to access said repository of templates and said repository of accent elements; and
   a computer-readable, non-transitory storage medium for providing computer program code means that is executable by said processing system and is comprised of executable code to perform the functions of:
      (i) receiving a connection from a client,
      (ii) delivering an object suitable for the selection of the first template from said repository of templates,
      (iii) receiving a selection of the first template from the client,
      (iv) delivering the first template to the client,
      (v) delivering an object suitable for the selection of a theme, and
      as requested by the client, delivering accent elements associated with a requested theme.

12. A production system as recited in claim 11, wherein said computer-readable, non-transitory storage medium further comprises executable code for:
   (vii) receiving an order from the client, the order including the identification of the first template and user selections made within that first template, those user selections specifying accent elements to be applied within the first template, the order specifying the content and composition of an accented product, and
   (viii) interpreting the order received from the client, said interpreting executing an automated step in the production of a product accented in conformance with the received order.

13. A production system as recited in claim 12, further wherein said production system further includes a user content repository, further wherein said program store is further executable by said processing system to (ix) receive user images from the client and deposit received user images into said user content repository, and wherein in the interpreting of the order including specified user images, said execution of the automated step renders a production image that includes the specified user images located within said user content repository.

14. A production system as recited in claim 13, wherein said production system is further configured to execute the automated step of producing a physical copy of a rendered production image.

15. A production system as recited in claim 13, wherein said processing system is not operable to return a rendered production image to a client.

16. A production system as recited in claim 12, wherein said production system is configured in said interpreting to execute the automated step of controlling a machine that produces portions of the accented product specified by the received identification of the first template and user selections in conformance with the received order.

17. A production system as recited in claim 11, wherein said production system is configured in said interpreting to execute the automated step of producing a set of human-readable instructions for the assembly of the received order specified by identification of the first template and user selections.

18. A production system as recited in claim 17, wherein said production system in the execution of the automated step of producing the set of human-readable instructions, utilizes a mapping of template and theme correspondences to part identification to produce instructions that reference part identification.

19. A production system as recited in claim 11, wherein each template in said repository of templates specifies a set of accent pairs, each accent pair specifying an accent position, a page and a slot.

20. A production system as recited in claim 12, wherein said production system further includes an-other content repository containing content other than accent elements and user-provided content, and further wherein said program store is further executable by said processing system, (ix) as requested by a client, delivering content from said other content repository.

21. A method of creating a custom-accented product for a user located at a client system, said method comprising the steps of:
providing a server system operable to host network communications with clients, the server system including a repository of templates that each include a plurality of wells for receiving visual elements, said templates further including instructions for rendering an image as specified by current selection states, the instructions further specifying the position of the visual elements within a rendered image and an accented product, the server system additionally including a repository of accented elements, wherein the plurality of wells of a first template from the repository of templates is configured to rotate within the first template as it changes its orientation, and wherein instructions for the first template indicate that a first of the visual elements is to rotate and change its orientation in correspondence with a change in orientation of the first template, while a second of the visual elements is to maintain its original orientation as the first template changes its orientation;
receiving a connection from a client;
delivering an object suitable for the selection of the first template from the repository of templates;
receiving a selection of the first template from the client;
delivering the first template from the repository of templates to the client;
delivering an object suitable for the selection of a theme;
as requested by the client, delivering accented elements associated with a selected theme;
receiving an order from the client, the order including the identification of the first template and user selections made within that template; and
interpreting the order received from the client, said interpreting applying the user selections received with the order to the first template, those user selections specifying visual elements to be applied within the first template.

22. A method as recited in claim 21, further comprising the steps of: operating a client system operable to access the server system over network communications; maintaining, at the client system, the state of user selections as to a desired theme and optionally to a rotational factor and a swap factor; at the client system, downloading the first template from the server system and interpreting the first template with reference to the state of user selections to produce a representation of the first template with the user selections applied, the production including the retrieval of accent elements and other content from the server system; and by the client system, delivering to the server system the order including identification of the first template and a set of user selections relative to the first template.

23. A method as recited in claim 21, further comprising the steps of: maintaining a user content repository; receiving user content from the client and depositing that content into the user content repository; wherein in the interpreting of the order received from the client, said interpreting processes specified and received user content located within the user content repository into a produced presentation.

24. A computer program product for implementing within a computer system a method for producing an accented product in accordance with personal selections, the computer program product comprising:
a computer-readable, non-transitory medium for providing computer program code means utilized to implement the method, wherein the computer program code means comprises executable code for implementing the steps of:
providing a repository of templates, each of said templates including a plurality of wells for receiving visual elements, said templates further including instructions for receiving and maintaining selection states and further including instructions for rendering an image as specified by current selection states, said instructions further specifying the position of the visual elements within a rendered image and an accented product, wherein the plurality of wells of a first template from the repository of templates are configured to rotate with the first template as it changes its orientation, and wherein instructions for the first template indicate that a first of the visual elements is to rotate and change its orientation in correspondence with a change in orientation of the first template, while a second visual element is to maintain its original orientation as the first template changes its orientation;
providing a repository of accent elements;

receiving a template selection from the client, wherein the client selects the first template;

receiving an accent element selection from the repository of accent elements; and generating a rendered image of the accented product, wherein the accented product comprises the first template and the accent element selection, and wherein the first template is rotatable about its central axis in increments of 90, 180, and 270 degrees, and wherein the first visual element is able to rotate and change its orientation in correspondence with a change in orientation of the first template, while the second visual element is able to maintain its original orientation as the first template changes its orientation.

25. The computer program product of claim 24, wherein a plurality of accent elements belong to a first theme, and wherein the accent elements of the first theme are configured to retain a first orientation as the first template changes its orientation.

26. The computer program product of claim 24, wherein the computer program code further comprises of executable code for implementing a step of interpreting an order received from a client, said interpreting applying user selections received with the order to the first template, those user selections specifying visual elements to be applied within the first template.

* * * * *